United States Patent
Sellhorn et al.

(10) Patent No.: US 11,162,370 B2
(45) Date of Patent: Nov. 2, 2021

(54) ACTIVELY COOLED COMPONENT

(71) Applicant: Rolls-Royce Corporation, Indianapolis, IN (US)

(72) Inventors: Jim Sellhorn, Indianapolis, IN (US); Brett Barker, Indianapolis, IN (US); Jeff Rhodes, Zionsville, IN (US)

(73) Assignee: Rolls-Royce Corporation, Indianapolis, IN (US)

(*) Notice: Subject to any disclaimer, the term of this patent is extended or adjusted under 35 U.S.C. 154(b) by 627 days.

(21) Appl. No.: 15/432,599

(22) Filed: Feb. 14, 2017

(65) Prior Publication Data
US 2018/0266253 A1 Sep. 20, 2018

Related U.S. Application Data

(60) Provisional application No. 62/338,861, filed on May 19, 2016.

(51) Int. Cl.
*F01D 5/18* (2006.01)
*F01D 9/04* (2006.01)
*F01D 25/12* (2006.01)

(52) U.S. Cl.
CPC .............. *F01D 5/187* (2013.01); *F01D 5/186* (2013.01); *F01D 9/041* (2013.01); *F01D 25/12* (2013.01); *F05D 2220/32* (2013.01); *F05D 2260/201* (2013.01); *F05D 2260/202* (2013.01); *F05D 2260/204* (2013.01);
(Continued)

(58) Field of Classification Search
CPC .......... F01D 5/186; F01D 5/187; F01D 25/12; F05D 2220/32; F05D 2260/201; F05D 2260/202; F05D 2260/2212
See application file for complete search history.

(56) References Cited

U.S. PATENT DOCUMENTS 5,152,667 A 10/1992 Turner et al.
5,383,766 A * 1/1995 Przirembel ............. F01D 5/186
416/92
(Continued)

FOREIGN PATENT DOCUMENTS

EP 2 230 381 A2 9/2010
EP 2 233 693 A1 9/2010

OTHER PUBLICATIONS

Extended European Search Report for European Application No. 17 168 136.4 dated Oct. 5, 2017, 7 pages.

*Primary Examiner* — Justin D Seabe
*Assistant Examiner* — Aye S Htay
(74) *Attorney, Agent, or Firm* — Crowell & Morning LLP (57) ABSTRACT

An actively cooled component can be an airfoil, such as an air foil in a jet turbine engine. The component may have a body comprising at least one internal channel adapted for a flow of a cooling media therein. The channel may have two side walls separating a cold inner surface and a hot inner surface. The cold inner surface may have two impingement holes in fluid communication with a cooling media source, allowing for ingress of the cooling media into the internal channel. The hot inner surface may have one angled film hole in fluid communication with a hot outer surface, allowing for egress of the cooling media out of the internal channel. The first and second side walls may enclose a length of the internal channel along which the angled film hole is located between the two impingement holes.

18 Claims, 10 Drawing Sheets

(52) U.S. Cl.
CPC ............... *F05D 2260/2212* (2013.01); *F05D 2260/2214* (2013.01); *F05D 2260/22141* (2013.01); *Y02T 50/60* (2013.01)

(56) References Cited

U.S. PATENT DOCUMENTS

| | | | |
|---|---|---|---|
| 5,660,524 A | 8/1997 | Lee et al. | |
| 5,667,359 A * | 9/1997 | Huber | F01D 5/187 416/96 A |
| 5,702,232 A * | 12/1997 | Moore | F01D 5/186 416/95 |
| 6,213,714 B1 * | 4/2001 | Rhodes | F01D 5/186 416/96 R |
| 6,264,428 B1 * | 7/2001 | Dailey | F01D 5/187 416/97 R |
| 6,282,905 B1 * | 9/2001 | Sato | F23R 3/002 60/752 |
| 6,379,118 B2 * | 4/2002 | Lutum | F01D 5/186 416/97 R |
| 6,808,367 B1 * | 10/2004 | Liang | F01D 5/187 415/115 |
| 7,273,351 B2 | 9/2007 | Kopmels | |
| 7,377,746 B2 | 5/2008 | Brassfield et al. | |
| 7,637,720 B1 | 12/2009 | Liang | |
| 7,690,892 B1 | 4/2010 | Liang | |
| 7,789,626 B1 | 9/2010 | Liang | |
| 7,866,948 B1 * | 1/2011 | Liang | F01D 5/187 416/97 R |
| 7,921,654 B1 * | 4/2011 | Liang | F01D 9/041 60/806 |
| 8,092,177 B2 | 1/2012 | Liang | |
| 8,328,517 B2 | 12/2012 | Liang | |
| 8,408,866 B2 | 4/2013 | Weaver et al. | |
| 8,777,571 B1 | 7/2014 | Liang | |
| 8,961,133 B2 | 2/2015 | Kwon | |
| 2001/0016162 A1 * | 8/2001 | Lutum | F01D 5/186 416/97 R |
| 2011/0027102 A1 * | 2/2011 | Nakamata | F01D 5/186 416/97 R |
| 2014/0238030 A1 | 8/2014 | Gerendas | |
| 2015/0016947 A1 * | 1/2015 | Kwon | F01D 5/186 415/1 |

\* cited by examiner

ACTIVELY COOLED COMPONENT

CROSS-REFERENCE TO RELATED APPLICATIONS

The present patent application claims the benefit of the filing date under 35 U.S.C. § 119(e) of U.S. Provisional Patent Application Ser. No. 62/338,861, which was filed on May 19, 2016, wherein the entirety of the aforementioned application is hereby incorporated by reference.

TECHNICAL FIELD

The present examples relate generally to heat exchanger designs, and more particularly, to heat exchanger designs that use film cooling and/or convective cooling, for example, an airfoil or other component of a gas turbine engine such as a turbine blade or nozzle guide vane.

BACKGROUND

Gas turbine engine airfoils, particularly those that require cooling, remain an area of interest. Some existing systems have various shortcomings, drawbacks, and disadvantages relative to certain applications. Accordingly, there remains a need for further contributions in this area of technology.

SUMMARY

The disclosed embodiments relate to an actively cooled component, for example, an airfoil in a gas turbine engine.

In one example, the component may have a body comprising at least one internal channel adapted for a flow of a cooling media therein. The internal channel may have two side walls separating a cold inner surface and a hot inner surface. The cold inner surface may have two impingement holes in fluid communication with a cooling media source, allowing for ingress of the cooling media into the internal channel. The hot inner surface may have one angled film hole in fluid communication with a hot outer surface, allowing for egress of the cooling media out of the internal channel. The first and second side walls may enclose a length of the internal channel along which the angled film hole is located between the two impingement holes. The angled film hole may be considered a first angled film hole, and the hot inner surface may further comprise a second angled film hole also in fluid communication with the hot outer surface. Furthermore, the two side walls may enclose a length of the channel along which the first impingement hole is located between the first and second angled film holes.

In another example, the actively cooled component may further comprise a plurality of impingement holes and a plurality of angled film holes. The plurality of impingement holes may be aligned along a first axis and the plurality of angled film holes may be aligned along a second axis parallel to the first axis.

In another example, the impingement holes may direct the cooling media at the hot inner surface to create a turbulent flow, and the angled film hole may be angled to direct the cooling media along the hot outer surface to create a laminar film. The angled film hole may be at an acute angle less than or equal to 45 degrees relative to the hot outer surface. In another example, the plurality of film holes 260 may be clocked in any direction, for example, the film holes 260 may align with the gas path flow field. The film holes 260 may not necessarily point in the same direction and can be individually tailored.

In another example, the actively cooled component may further comprise a plurality of pairs of impingement holes. Each pair of impingement holes may comprise an "L" impingement hole aligned along a first axis, and an "R" impingement hole aligned along a second axis parallel to the first axis. The actively cooled component may further comprise a plurality of angled film holes which may be aligned along a third axis parallel to the first and second axes. The third axis may be located between the first and second axes.

In a further example, the actively cooled component may further comprise a plurality of impingement holes and a plurality of angled film holes. There may be at least twice as many impingement holes as angled film holes. The component may further comprise a plurality of internal channels, each having only one angled film hole and at least two impingement holes. The actively cooled component may be located at a leading edge of an airfoil.

In another example, at least one side wall may have two concave portions relative to the internal channel that intersect with one another to form a convex intersection point. Each concave portion may have a unique radius of curvature different. A second side wall may be substantially symmetrical to the first side wall.

In another example, the actively cooled component may further comprise a plurality of impingement holes and a plurality of angled film holes. The internal channel may have a first portion with a ratio of impingement holes to angled film holes of at least two-to-one, and may have a second portion with a ratio of impingement holes to angled film homes of one-to-one.

In another example, a first impingement hole may be located closer to a first side wall than a second side wall, while a second impingement hole may be located closer to the second side wall than the first side wall. Furthermore, the first impingement hole may be located closer to the first angled film hole than the second angled film hole, and the second impingement hole may be located closer to the second angled film hole than the first angled film hole.

The methods and systems disclosed herein are nonlimiting and may be applied to other actively cooled components. Other systems, methods, features and advantages of the invention will be, or will become, apparent to one with skill in the art upon examination of the following figures and detailed description. It is intended that all such additional systems, methods, features and advantages be within the scope of the invention, and be encompassed by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

Active Cooling

Gas turbine engines of the axial flow type may include turbines that are made up of axially alternate annular arrays of radially extending stator airfoil vanes and rotary airfoil blades. The demands of modern gas turbine engines may require that the gases that flow through, and thereby drive, the turbine are at extremely high temperature. As the gases flow through the turbine, their temperature progressively falls as they drive the turbine. However, notwithstanding this, the gas temperatures in the higher pressure regions of the turbine may be so high that some form of airfoil cooling may be required.

Turbine airfoils, both blades and vanes, may be cooled internally with a gas or a liquid, such as air that has been tapped from the gas turbine engine's compressor. Using engine compressor air in this manner may, however, carry a penalty in terms of the overall operating efficiency of the engine. Thus, cooling of the components of the gas turbine engine is preferably accomplished with a minimum amount of cooling media, since the cooling media may be a working fluid, which has been extracted from the compressor, and its loss from the gas flow may rapidly reduce engine efficiency. Generally speaking, the larger the percentage of air taken from the compressor, the greater the adverse effect there is upon overall engine operating efficiency. Engines may be designed to simultaneously operate within a specified temperature range, while minimizing the amount of cooling media extracted from the compressor. If these design parameters are not satisfied, a corresponding structural degradation of the engine components may result, or the efficiency of the engine may be reduced because an excessive quantity of cooling media was extracted from the compressor.

It is therefore advantageous to make efficient use of compressor-derived air in the cooling of airfoils. Methods of cooling may include convection cooling and film cooling.

Convection cooling generally refers to a technique of transferring heat from a surface of an object to the environment by the movement of matter, for example, cooling internal surfaces of the component (e.g., airfoil) by directing a steady flow of pressurized cooling media through a network of internal passageways of the component. The pressurized cooling media may enter the passageways via cooler inlet holes and exiting through hotter exit holes. This may provide for convective heat transfer from the walls of the component to the cooling media.

Accordingly, the design of airfoils may include internal channels for the flow of cooling air. Such channels may provide convection cooling such that air is drawn from a hollow airfoil interior (e.g., reservoir of cooled air) and through small inlet holes into the channels (e.g., radially extending passages or impingement holes) where the air may absorb heat from the surfaces of the channels. Some of the air may be exhausted through small exit holes that provide fluid communication between the channels and the airfoil external surface. As the air is exhausted from the holes, it may form a film on the airfoil external surface that provides additional airfoil cooling via film cooling.

Film cooling generally refers to a technique of cooling an external surface of the component (e.g., airfoil) that is being heated by the high temperature gas, and may involve directing a flow of relatively cool media, such as air, along the component's external surface. The cooling media may function as an insulating layer to reduce the unwanted heating of the external surface of the component by the flow of high temperature gas.

Gas Turbine Engine

Figure 1:
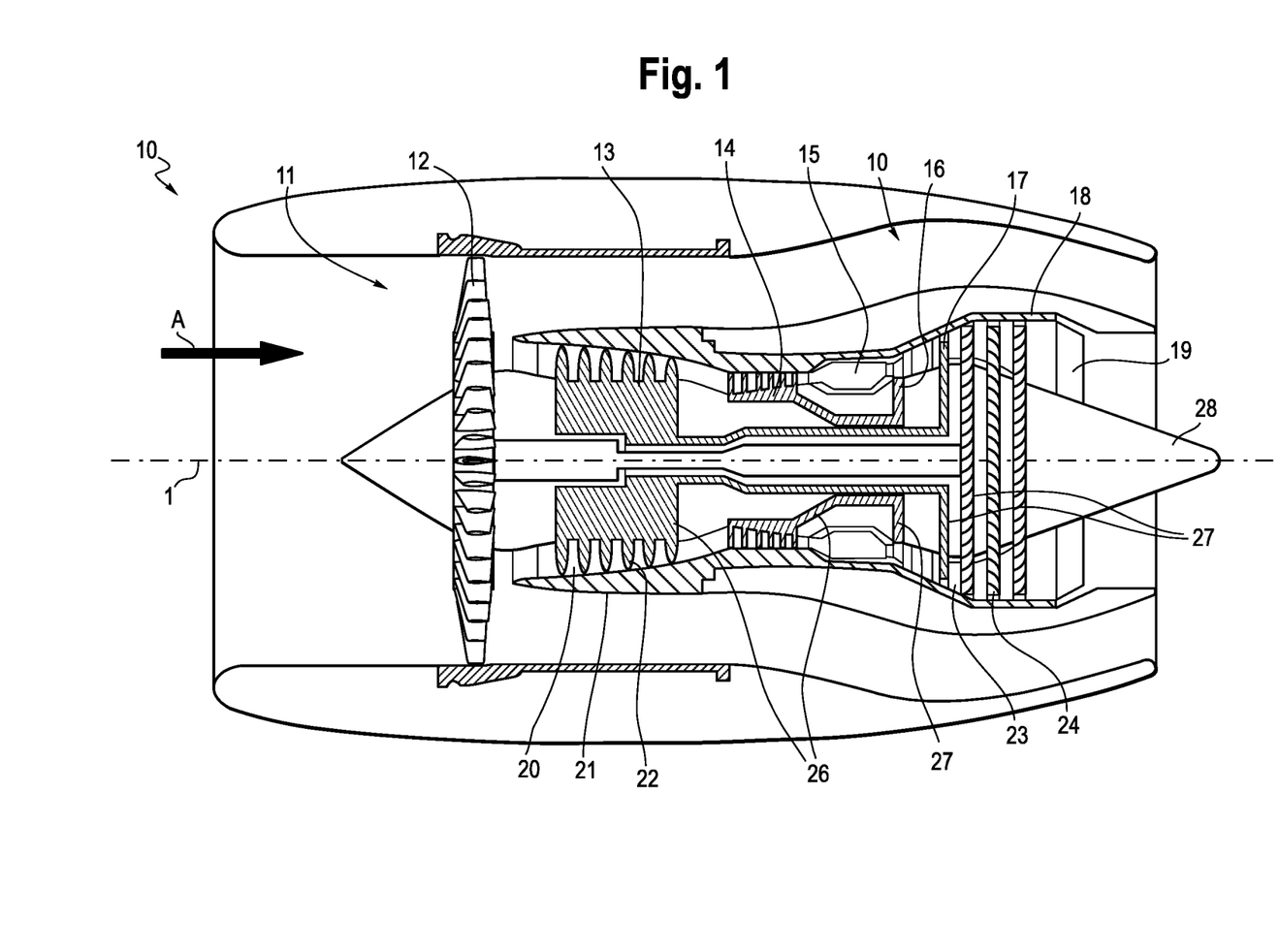
FIG. 1 is a side view of a gas turbine engine with internal components shown.

FIG. 1 illustrates a gas turbine engine 10 which may include a compressor, a combustor, and a power turbine. The three components may be integrated together to produce a flight propulsion engine, for example, for use in helicopters, airplanes, missiles, and any other substantially similar devices.

More specifically, the engine 10 may include, in the flow direction, an air inlet 11, a fan 12 rotating inside a casing, an intermediate-pressure compressor 13, a high-pressure compressor 14, a combustion chamber 15, a high-pressure turbine 16, an intermediate-pressure turbine 17 and a low-pressure turbine 18 as well as an exhaust nozzle 19, all of which being arranged about a center engine axis 1.

The intermediate-pressure compressor 13 and the high-pressure compressor 14 may each include several stages, of which each has an arrangement extending in the circumferential direction of fixed and stationary guide vanes 20, generally referred to as stator vanes and projecting radially inwards from the engine casing 21 in an annular flow duct through the compressors 13 and 14. The compressors furthermore may have an arrangement of compressor rotor blades 22 which project radially outwards from a rotatable drum or disk 26 linked to hubs 27 of the high-pressure turbine 16 or the intermediate-pressure turbine 17, respectively.

The turbine sections 16, 17 and 18 may have similar stages, including an arrangement of fixed stator vanes 23 projecting radially inwards from the casing 21 into the annular flow duct through the turbines 16, 17, and 18, and a subsequent arrangement of turbine blades 24 projecting outwards from a rotatable hub 27. The compressor drum or compressor disk 26 and the blades 22 arranged thereon, as well as the turbine rotor hub 27 and the turbine rotor blades 24 arranged thereon, may rotate about the engine axis 1 during operation.

The stationary guide vanes 20, compressor rotor blades 22, fixed stator vanes 23, and turbine blades 24 may collectively be referred to as airfoils 100 (see FIG. 2), and hereinafter this application will refer to blades and/or vanes as airfoils 100, unless specifically stated otherwise in the text. As discussed later in this application, at least a portion of the airfoils 100 may have a dual-wall cooling configuration to improve the cooling.

Other products utilizing the present concepts are contemplated herein including but not limited to combustor liners, exhaust nozzles, exhaust liners, airframe wing leading edges, and/or other actively cooled components. Depending on configuration, additional compressors and turbines may be added with intercoolers connecting between the compressors and reheat combustion chambers may be added between the turbines.

In one example, the gas turbine engine airfoils 100 are formed of a heat resistant superalloy composition. There are various types of superalloy compositions, such as but not limited to nickel based or cobalt based compositions. Most superalloy compositions of interest are complicated mixtures of nickel, chromium, aluminum and other select elements. The airfoils may be of a unitary cast configuration, and/or an assembly of cast components, and/or an assembly of cast and wrought components. The airfoils may have an equiax, directionally solidified or a single crystal alloy structure. In an example, the gas turbine engine airfoils 100 are of a cast single crystal single structure. In other examples, the products are formed of a metallic material, or an intermetallic material or a ceramic material.

Airfoil

Figure 2:
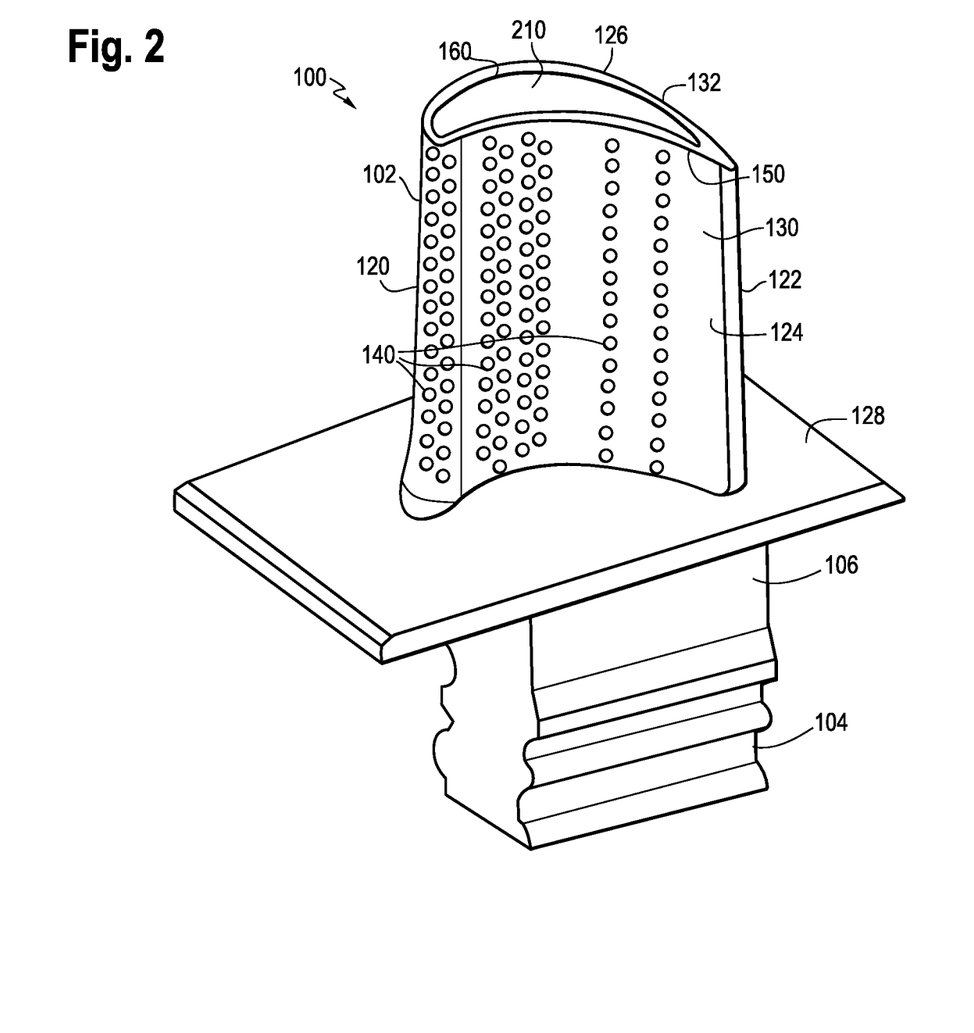
FIG. 2 illustrates a perspective view of one example of an airfoil of a gas turbine engine.

FIG. 2 illustrates a perspective view of one example of an airfoil 100 of a gas turbine engine 10. The airfoil 100 may have as principal regions an airfoil portion 102, a root portion 104, and a shank portion 106 extending between the airfoil portion 102 and the root portion 104. The shank portion 106 may have a central conduit (not shown) formed therein which is in fluid communication with a hollow cavity/passageway 210 (see also FIG. 3) within the airfoil 100. The hollow cavity 210 may function as an internal passageway for receiving cooling media from the compressor and distributing it within the airfoil 100. The cooling media may be a compressible fluid such as air.

The airfoil 100 may have a leading edge 120, a trailing edge 122, and an outer surface 124 extending therebetween. Hereinafter, the term spanwise will indicate an orientation between a tip 126 and a platform 128; and the term streamwise will indicate an orientation between the leading edge 120 and the trailing edge 122. The leading edge 120 may face in an upstream direction with respect to the approaching fluid flow and the trailing edge 122 may face in a downstream direction. The airfoil 100 may include a concave pressure side 130 and an opposite convex suction side 132. Arranged along the outer surface 124 of the airfoil 100 may be a plurality of cooling media exit holes 140 that may allow for the discharge of cooling media across the outer surface 124.

One example of the cooling scheme includes a plurality of cooling media exit holes 140 (e.g., plurality of angled film holes 260) along the outer surface 124 of the pressure side 130. The suction side 132 may also have a plurality of exit holes (not shown). The exit holes 140 may be arranged in a closely-spaced array to help compensate for the heat load on the airfoil 100 related to the high temperature working fluid flowing thereover. It is understood that the airfoil 100 illustrated in FIG. 2 is not intended to be limiting and other airfoil and airfoil cooling designs are contemplated herein. The location, size, and quantity of cooling media exit openings may be driven by the design parameters of a specific application.

Airfoil Cross-Section: Walls/Holes

Figure 3:
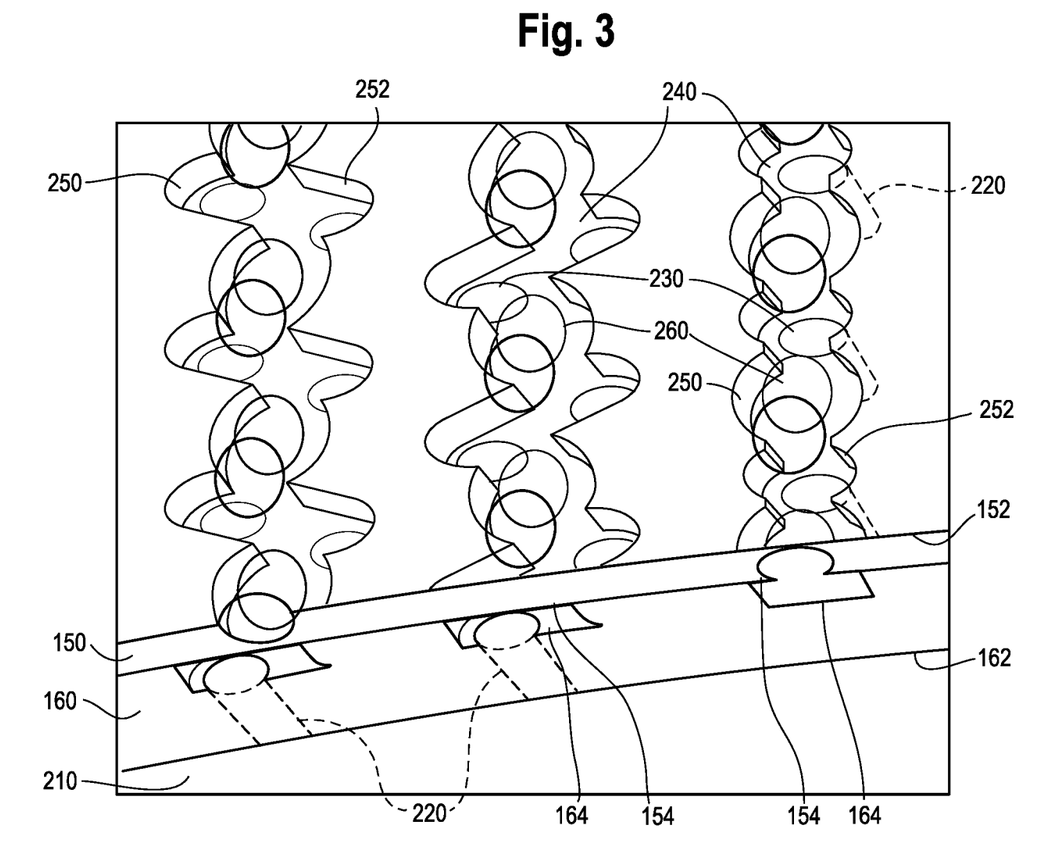
FIG. 3 illustrates a cutaway perspective view of an example airfoil.

FIG. 3 illustrates a cutaway perspective view of an example airfoil 100. Airfoil 100 may have a cover member 150, a spar member 160, and a hollow cavity/passageway 210 extending therethrough (see also FIG. 2). The hollow cavity 210 may be in fluid communication with the central conduit of the shank portion 106, which itself may be in fluid communication with cooling media from the compressor. These connected passageways may act as a cooling media reservoir.

Cooling media from the hollow cavity 210 may deliver cooling media to one or more internal channels 240 within the airfoil 100 via one or more apertures 220 in the spar member 160. The internal channel 240 may be positioned between the cover member 150 and spar member 160 such that the internal channel 240 is adjacent to the perimeter of the airfoil 100. The cover member 150 may be exposed to the high temperature working fluid flowing, and thus may have a hot outer surface 152 forming at least a portion of the outer surface 124 of the airfoil, and a hot inner surface forming at least a portion of a hot inner surface 154 of the internal channel 240. The spar member 160 may be exposed to the cold hollow cavity 210, and thus have a cold outer surface 162 forming at least a portion of a surface of the hollow cavity 210, and a cold inner surface forming at least a portion of a cold inner surface 164 of the internal channel 240. The internal channel 240 may have a first side wall 250 and a second side wall 252, both separating the cold inner surface 164 and the hot inner surface 154 of the spar member 160 and cover member 150, respectively. The spar member 160 may further comprise a plurality of impingement holes 230 in fluid communication with the internal channel 240 and the cold outer surface 162 of the spar member 160 (including hollow cavity 210 and apertures 220). The cover member 150 may further comprise a plurality of angled film holes 260 (e.g., exit holes 140) in fluid communication with the internal channel 240 and the hot outer surface 152 of the cover member 150 (e.g., outer surface 124 of airfoil 100).

In an example, the cover member 150 may be a thin walled member, and may have a wall thickness in the range of about 0.35 millimeters to 0.65 millimeters. In another example the cover member 150 may have a wall thickness of about 0.51 millimeters. However, other wall thicknesses are contemplated herein.

The thickness of the cover member 150 may be related to the dimensions of the plurality of angled film holes 260 (e.g., exit holes 140). Each of the plurality of angled film holes 260 may have a length "L" and a diameter "D", where the ratio of L/D is greater than one. The L/D ratio greater than one may encourage film cooling by allowing the cooling media to achieve a less turbulent flow as it progresses through the plurality of angled film holes 260 and is directed onto the hot outer surface 152 of the cover member 150. While in the examples illustrated herein the internal channels 240 may be illustrated without cooling pedestals, other examples are considered herein where the internals channels 240 may have at least one cooling pedestal.

As shown in FIG. 3, there may be a plurality of internal channels 240 positioned around the perimeter of the airfoil 100. The internal channels 240 may be closely arranged to help compensate for the heat load on the airfoil 100. Each internal channel 240 may comprise a plurality of apertures 220, a plurality of impingement holes 230, and a plurality of angled film holes 260 (e.g., a plurality of exit holes 140). The plurality of apertures 220 and impingement holes 230 may be formed through the spar member 160 to allow the flow of pressurized cooling media into the plurality of internal channels 240. The cooling media may flow through the internal channel 240 and absorb heat via convection from the hot inner surface 154 of the cover member 150 and the side walls 250 and 252. In some examples, the cooling media may also absorb heat via convection cooling from the cold inner surface 164 of the cover member 160. The plurality of angled film holes 260 (e.g., exit holes 140) may be formed through the cover member 150 to allow the flow of the cooling media to exit the internal channel 240. The plurality of angled film holes 260 may be angled such that the cooling media is directed towards the outer surface 124 of the airfoil 100, forming a laminar film thereon.

Single Cold-Feed Example

Figure 4:
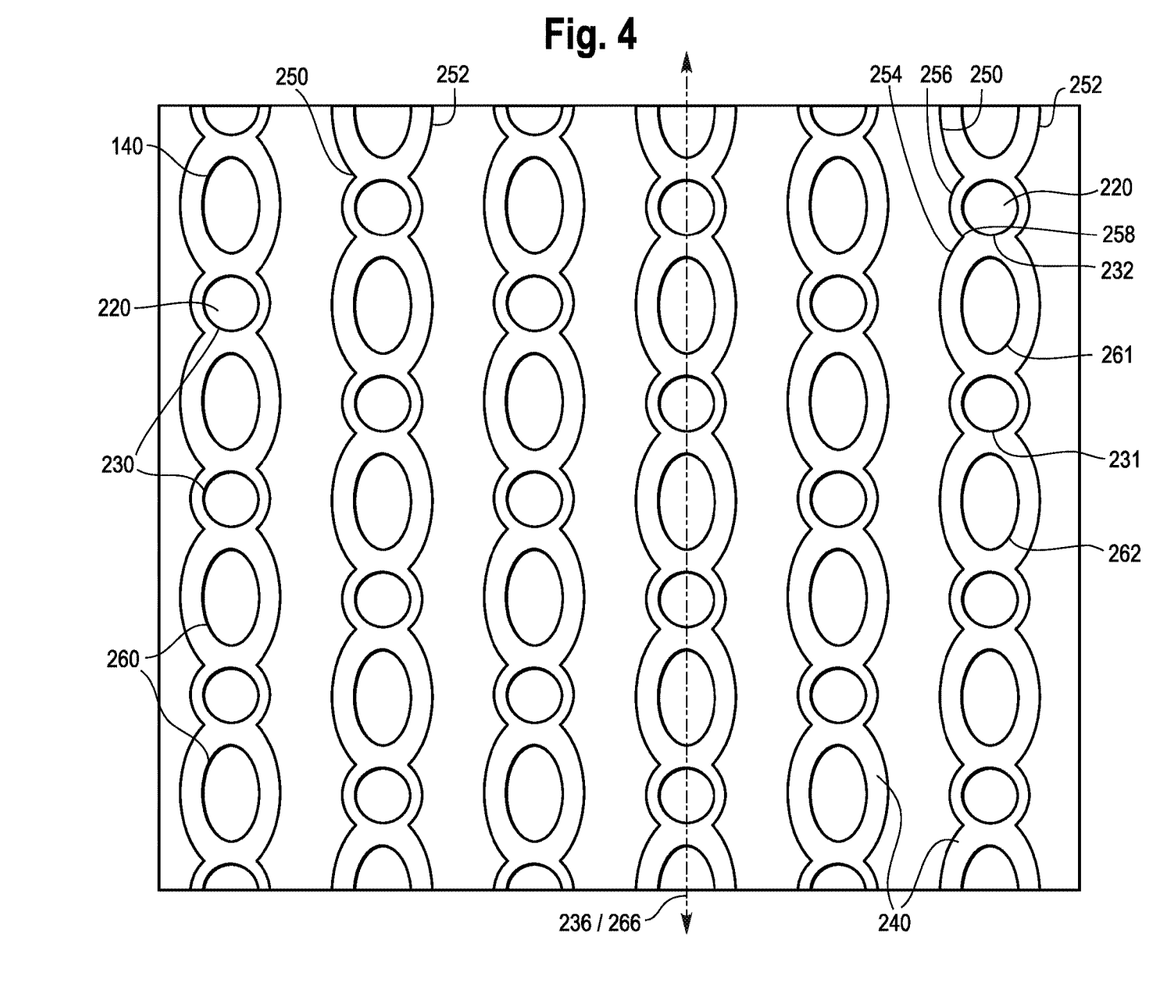
FIG. 4 illustrates a cross-sectional view of one of the example internal channels of an airfoil shown in FIG. 3.

FIG. 4 illustrates a cross-sectional view of one of the example internal channels 240 of an airfoil 100 shown in FIG. 3. The first side wall 250 and second side wall 252 may both separate the cold inner surface 164 and the hot inner surface 154 of the spar member 160 and cover member 150, respectively (see FIG. 3). The apertures 220 in the cold inner surface 164 may comprise a first impingement hole 231 and a second impingement hole 232 both in fluid communication with the hollow cavity 210 (e.g., cooling media source) for ingress of the cooling media into the internal channel 240. The exit holes 140 in the hot inner surface 154 may comprise a first angled film hole 261 in fluid communication with the hot outer surface 152 of the cover member 150 for egress of the cooling media out of the internal channel 240. The first and second side walls 250 and 252, respectively, may enclose a length of the channel along which the first angled film hole 261 is located between the first and second impingement holes 231 and 232, respectively. As shown, the impingement holes 230, 231, and 232 may appear circular, whereas the angled film holes 260, 261, and 262 may appear elliptical. This may be a result of the cross-sectional view, wherein the angled film holes are oriented at an acute angle such that they appear elliptical while the impingement holes are oriented at an orthogonal angle such that they appear circular.

The first side wall 250 and second side wall 252 may have a variety of shapes and contours. For example, the first side wall 250 may have a first concave portion 254 relative to the internal channel 240. The first side wall 250 may also have a second concave portion 256 intersecting the first concave portion 254, forming a convex intersection point 258 relative to the internal channel 240. The first concave portion 254 may have a first radius of curvature, and the second concave portion 256 may have a second radius of curvature different from the first radius of curvature. The second side wall 252 may be substantially symmetrical to the first side wall 250, for example, having substantially symmetrical concave portions, convex portions, and respective radii of curvature.

The cooling media may flow from the hollow cavity 210, through the apertures 220, through first and second impingement holes 231 and 232, respectively, such that the cooling media enters the internal channel 240 and impinges on the hot inner surface 154 (see FIG. 3). Primarily driven by a pressure gradient, the cooling media may then flow through the internal channel 240 between the first and second side walls 250 and 252, respectively. The shape of the first and second side walls 250 and 252 may cause turbulence in the cooling media flow, for example, caused by the first concave portion 254 with the first radius of curvature, the second concave portion 256 having the second radius of curvature, the convex intersection point 258, and any shapes that may be present on the second side wall 252, for example, the second side wall 252 may be symmetrical to the first side wall 250. The cooling media may exit the internal channel 240 through the first angled film hole 261, which may direct the cooling media onto the hot outer surface 152 of the cover member 150 of the airfoil 100 (see FIG. 3). As the cooling media flows within the internal channel 240, it may absorb heat via convective heat transfer from any surface having a higher temperature than the cooling media itself, including the hot inner surface 154, the first side wall 250, the second side wall 252, and the cold inner surface 164.

Continuing with this example, the internal channel 240 may further comprise a second angled film hole 262 in fluid communication with the hot outer surface 152 of cover member 150. The first and second side walls 250 and 252, respectively, may enclose a length of the internal channel 240 along which the first impingement hole 231 is located between the first and second angled film holes 261 and 262, respectively. Thus, along this length of the internal channel 240 is an alternating pattern, wherein the first impingement hole 231 is spaced between two angled film holes, and the first angled film hole is spaced between two impingement holes. As a result, there is a one-to-one ratio of impingement holes to angled film holes.

As shown in FIG. 4, internal channels 240 of the airfoil 100 may further comprise a plurality of impingement holes 230 and a plurality of angled film holes 260. The of impingement holes may be aligned along a first impingement hole axis 236, and wherein the plurality of angled film holes may be aligned along a first angled film hole axis 266. The first impingement hole axis 236 may be parallel to the first angled film hole axis 266. In some examples, as shown in FIG. 4, the first impingement hole axis 236 may be identical to the first angled film hole axis 266.

The plurality of impingement holes 230 and angled film holes 260 may facilitate cooling. As the cooling media impinges on the hot inner surface 154 and flows within the internal channel 240, the concave and convex shape of the side walls 250 and 252 may create a turbulent flow. This turbulent flow may encourage mixing of the cooling media and increased heat transfer. As a result, the cooling media may remain in the internal channel 240 for a longer duration, increasing heat transfer from the surfaces of the internal channels 240. This may result in increased engine efficiency by reducing the amount of cooling media extracted from the compressor to cool the airfoil 100. Additionally, the turbulent flow and increased mixing of the cooling media may decrease the fraction of cooling media that enters through a given impingement hole and exits through the next angled film hole, again increasing heat transfer and engine efficiency.

Cooling media may flow through at least one of plurality of angled film holes 260 (including the first and second angled film holes 261 and 262). The angled film hole(s) may be angled to direct the cooling media along the hot outer surface 152 to create a laminar film for film cooling. This laminar film of cooling media may function as an insulating layer to reduce the unwanted heating of the hot outer surface 152 of the cover member 150 (and thus the outer surface 124 of the airfoil 100) by the flow of high temperature gas. The angle of the angled film hole(s) may be an acute angle, for example, less than or equal to 45 degrees relative to the hot outer surface 152. In some examples, this angle may be between 25-35 degrees. The optimal angle may differ based on engine and airfoils designs, however, in general the cooling media forms a suitable boundary layer to insulate the hot outer surface 152. In another example, the plurality of film holes 260 may be clocked in any direction, for example, the film holes 260 may align with the gas path flow field. The film holes 260 may not necessarily point in the same direction and can be individually tailored.

Dual Cold-Feed Example (Continuous Channel)

Figure 5:
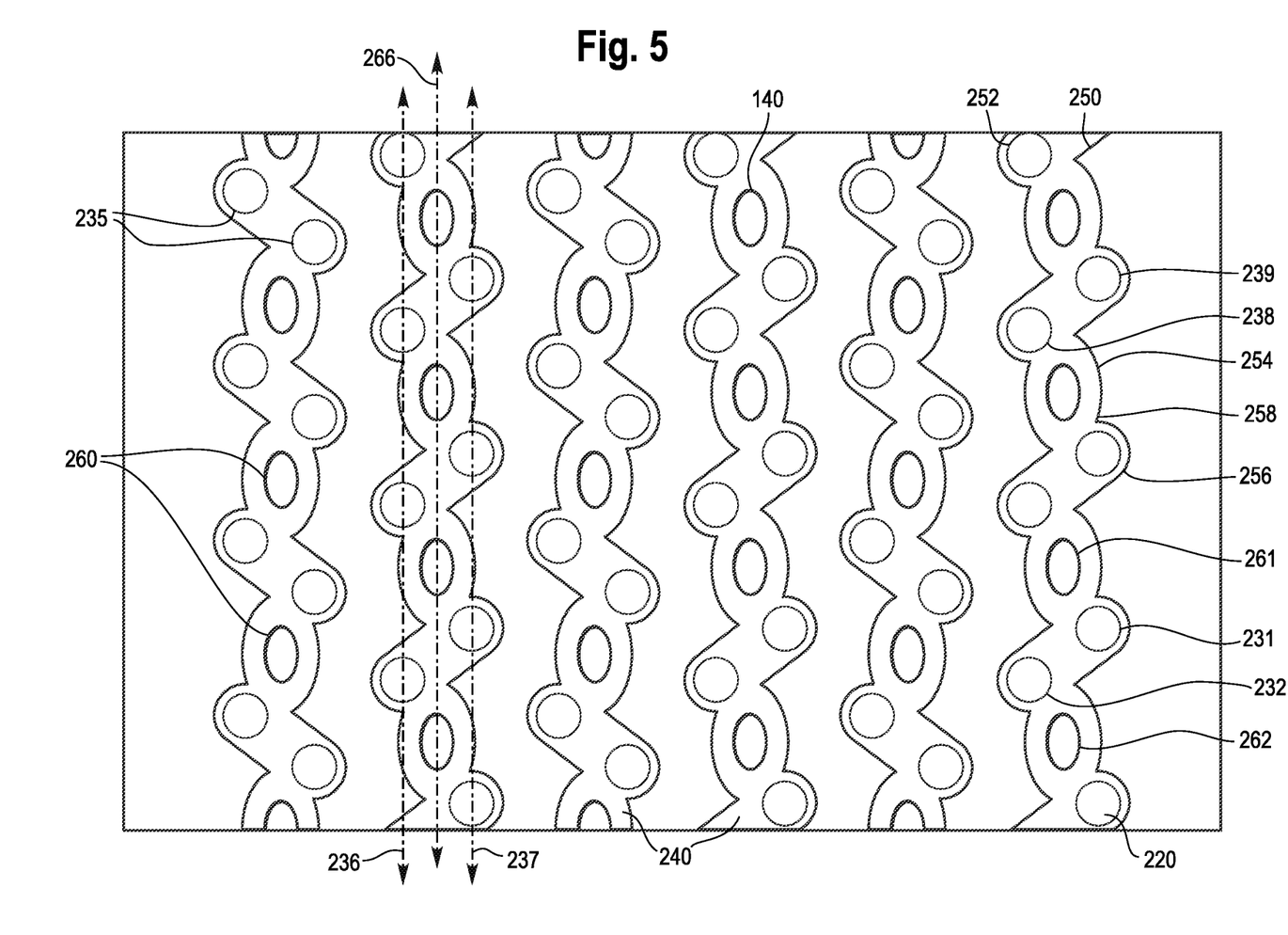
FIG. 5 illustrates a cross-sectional view of one of the example internal channels of an airfoil shown in FIG. 3.

FIG. 5 illustrates a cross-sectional view of one of the example internal channels 240 of an airfoil 100 shown in FIG. 3. The internal channel 240 may further comprise a plurality of pairs of impingement holes 235, wherein each pair of impingement holes comprises an "L" impingement hole 238 and an "R" impingement hole 239. The plurality of "L" impingement holes 238 may be aligned along a first impingement hole axis 236. The plurality of "R" impingement holes 239 may be aligned along a second impingement hole axis 237. The first and second impingement hole axes 236 and 237, respectively, may be parallel to one another. The internal channel 240 may further comprise a plurality of angled film holes 260 aligned along a first angled film hole axis 266. The first angled film hole axis 266 may be parallel to the first and second impingement hole axes 236 and 237, respectively. The first angled film hole axis 266 may be located between the first and second impingement hole axes 236 and 237, respectively. As discussed above with respect to FIG. 4, the impingement holes may appear circular, whereas the angled film holes may appear elliptical due to their acute angle.

As shown in FIG. 5, there may be at least twice as many impingement holes as angled film holes. In the illustrated example, this is because each of the plurality of pairs of impingement holes 235 may have just one corresponding angled film hole in the plurality of angled film holes 260, resulting in a two-to-one ratio. The first and second side walls 250 and 252 may enclose a length of the channel along which the first and second impingement holes 231 and 232 are located between the first and second angled film holes 261 and 262. The first impingement hole 231 may be located closer to the first side wall 250 than the second side wall 252, while the second impingement hole 232 may be located closer to the second side wall 252 than the first side wall 250. Furthermore, the first impingement hole 231 may be located closer to the first angled film hole 261 than the second angled film hole 262, while the second impingement hole 232 may be located closer to the second angled film hole 262 than the first angled film hole 261. The result may be a tortuous "zig-zag" shape of the internal channel 240.

Other ratios are possible for other designs and configurations. For example, there could be a three-to-one ratio of impingement holes to angled film holes (not shown).

Similar to FIG. 4, the first and second side walls 250 and 252 may have a variety of shapes and contours. For example, the first side wall 250 may have a first concave portion 254 relative to the internal channel 240. The first side wall 250 may also have a second concave portion 256 intersecting the first concave portion 254, forming a convex intersection point 258 relative to the internal channel 240. The first concave portion 254 may have a first radius of curvature, and the second concave portion 256 may have a second radius of curvature different from the first radius of curvature. The second side wall 252 may also have concave portions, convex portions, and respective radii of curvature.

The additional tortuosity ("zig-zag") of the internal channel 240 and the increased number of impingement holes may both facilitate additional cooling, while retaining the cooling properties of the plurality of impingement holes 230 and angled film holes 260. "Zig-zag" may be defined as a path that changes direction at regular intervals, for example, alternating ninety-degree turns to the left and right at fixed intervals. Other angles may also fall within this definition, as well as varying intervals.

As the cooling media impinges on the hot inner surface 154 (see FIG. 3) and flows within the internal channel 240, the cooling media may flow from an "L" impingement hole 238, towards an "R" impingement hole 239, and towards the next "L" impingement hole 238, towards the next "R" impingement hole 239, and so on. This "zig-zag" pattern of tortuous flow may further increase the turbulent flow of cooling media with the internal channel 240 in addition to the turbulence caused by the concave and convex shape of the side walls 250 and 252. This increased turbulent flow may further increase mixing of the cooling media and increased heat transfer. As a result, the cooling media may remain in the internal channel 240 for a longer duration, increasing heat transfer as well as engine efficiency. Additionally, the turbulent flow and increased mixing of the cooling media may decrease the fraction of cooling media that enters through a given impingement hole and exits through the next angled film hole, again increasing heat transfer and engine efficiency. As described above, the plurality of angled film holes 260 may be angled to direct the cooling media along the hot outer surface 152 to create a laminar film that may function as an insulating layer for film cooling. In another example, the plurality of film holes 260 may be clocked in any direction, for example, the film holes 260 may align with the gas path flow field. The film holes 260 may not necessarily point in the same direction and can be individually tailored.

Hybrid Example

Figure 6:
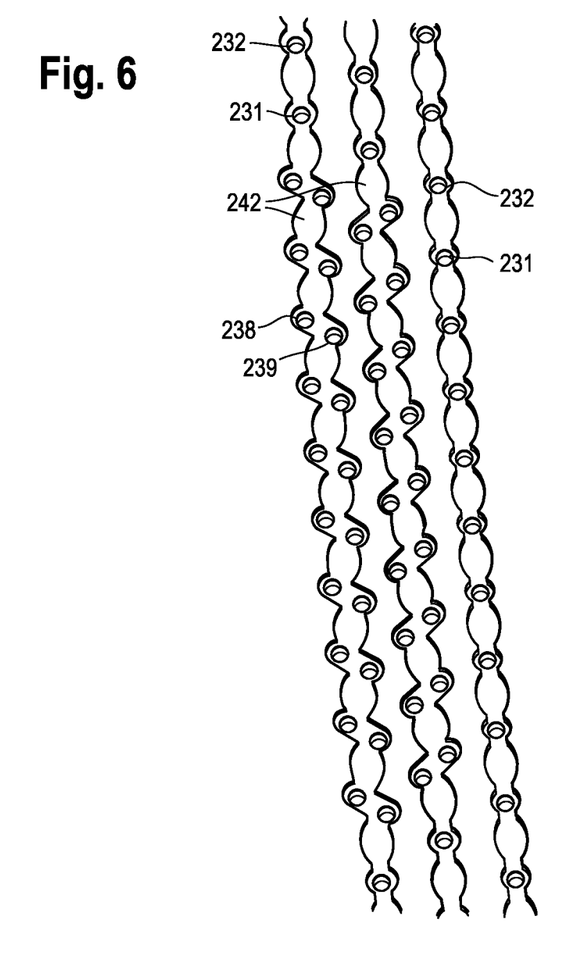
FIG. 6 illustrates a perspective view of an example of a plurality of internal channels of an airfoil.

FIG. 6 illustrates a perspective view of another example of a plurality of internal channels 240 of an airfoil 100. As shown, different examples of internal channels 240 may be adjacent to one another within a given airfoil 100. For example, the right-most channel has a ratio of impingement holes to angled film holes of one-to-one, whereas the adjacent channel has a higher ratio.

Furthermore, channel design may differ within a given internal channel 240, forming a hybrid internal channel 242. For example, as shown in FIG. 6, the two left-most channels are hybrid channels 242, each having at least one portion where the ratio of impingement holes to angled film holes is two-to-one and at least one portion where the ratio is one-to-one. For viewing purposes, the angled film holes are not shown in FIG. 6, though they are understood to be present.

Dual Cold-Feed Example (Isolated Channels)

Figure 7:
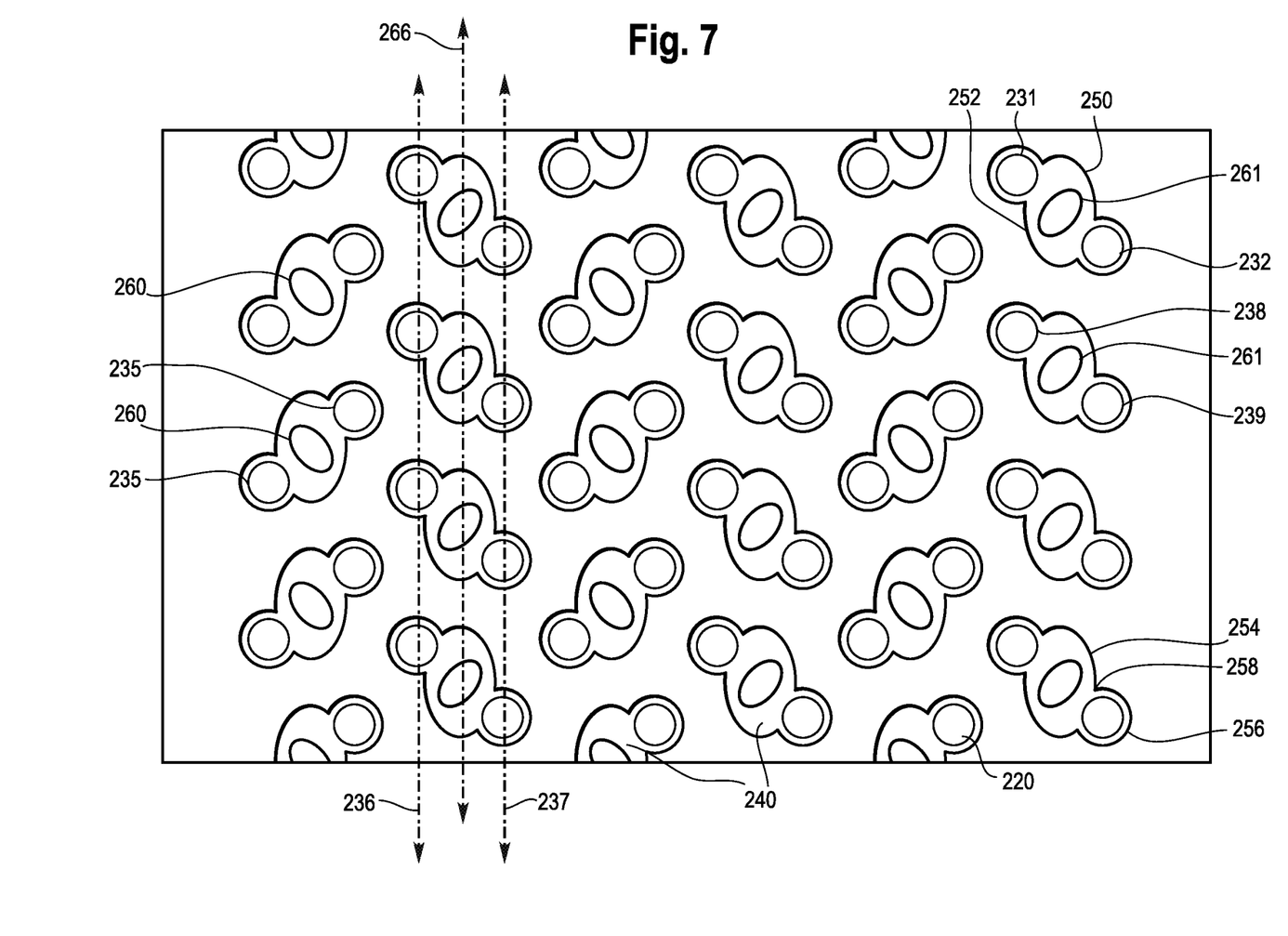
FIG. 7 illustrates a cross-sectional view of an example of an internal channel of an airfoil.
Figure 8:
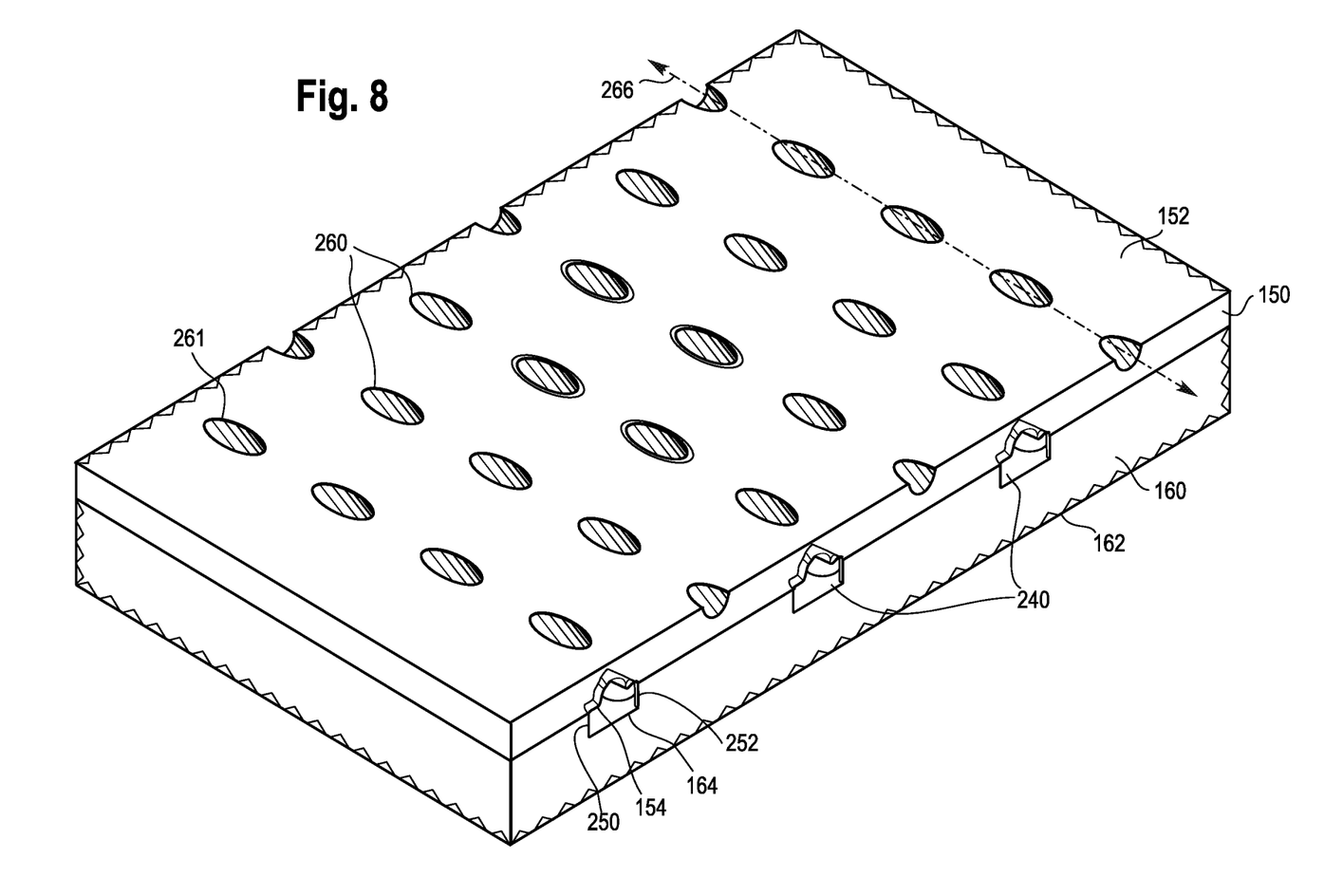
FIGS. 8-9 illustrate perspective views of the example of an internal channel of an airfoil shown in FIG. 7.
Figure 9:
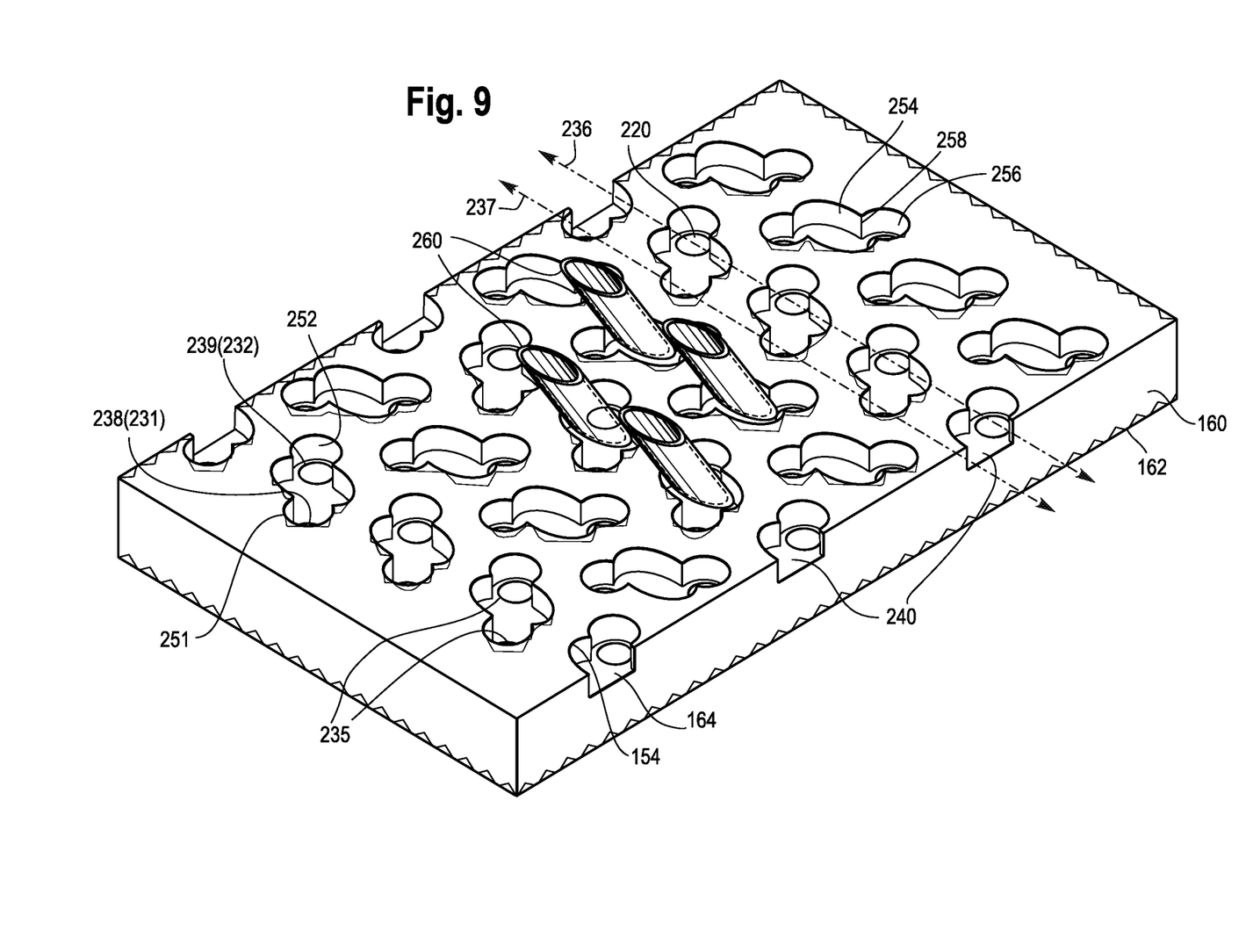

FIGS. 7-9 illustrate a cross-sectional view and two perspective views, respectively, of another example of an internal channel 240 of an airfoil 100. In FIG. 8, the cover member 150 obstructs the view of certain internal channels 240, while in FIG. 9 the cover member 150 has been hidden from view for illustration purposes. Additionally, in FIG. 9 all but four of the plurality of angled film holes 260 have also been hidden for illustration purposes. The internal channel 240 may further comprise a plurality of pairs of impingement holes 235 and a plurality of angled film holes 260. There may be at least twice as many impingement holes as angled film holes. The airfoil 100 may further comprise a plurality of internal channels 240.

Each pair of impingement holes 235 may comprise an "L" impingement hole 238 and an "R" impingement hole 239. The plurality of "L" impingement holes 238 may be aligned along a first impingement hole axis 236. The plurality of "R" impingement holes 239 may be aligned along a second impingement hole axis 237. The first and second impingement hole axes 236 and 237, respectively, may be parallel to one another. The internal channel 240 may further comprise a plurality of angled film holes 260 aligned along a first angled film hole axis 266. The first angled film hole axis 266 may be parallel to the first and second impingement hole axes 236 and 237, respectively. The first angled film hole axis 266 may be located between the first and second impingement hole axes 236 and 237, respectively. As discussed above with respect to FIGS. 4-5, the impingement holes may appear circular, whereas the angled film holes may appear elliptical due to their acute angle.

As shown in FIGS. 7-9, there may be at least twice as many impingement holes as angled film holes. In the illustrated example, this is because each of the plurality of pairs of impingement holes 235 may have just one corresponding angled film hole in the plurality of angled film holes 260, resulting in a two-to-one ratio. The first and second side walls 250 and 252 may enclose a length of the channel along which the first angled film hole 261 is located between the first and second impingement holes 231 and 232.

Similar to FIGS. 3-6, the first and second side walls 250 and 252 may have a variety of shapes and contours. For example, the first side wall 250 may have a first concave portion 254 relative to the internal channel 240. The first side wall 250 may also have a second concave portion 256 intersecting the first concave portion 254, forming a convex intersection point 258 relative to the internal channel 240. The first concave portion 254 may have a first radius of curvature, and the second concave portion 256 may have a second radius of curvature different from the first radius of curvature. The second side wall 252 may also have concave portions, convex portions, and respective radii of curvature.

Additionally, the angles of the plurality of angled film holes 260 may not be identical for each of the plurality of internal channels 240. For example, as shown in FIGS. 7-9, the angles of the plurality of angled film holes 260 may alternate such that the angles of the film holes of adjacent channels may be perpendicular to one another. This may provide targeted film cooling on the outer surface 124 of the airfoil 100. In another example, the plurality of film holes 260 may be clocked in any direction, for example, the film holes 260 may align with the gas path flow field. The film holes 260 may not necessarily point in the same direction and can be individually tailored.

As shown in FIGS. 7-9, each of the plurality of internal channels 240 may be limited to only one angled film hole. As such, the cooling media within each of the plurality of internal channels 240 is "isolated" because it can only flow within the channel and out of a single angled film hole. While the flow within the plurality of internal channels 240 may be turbulent, the lone angled film hole and shorter length in a given internal channel means the cooling media may spend less time mixing. As a result, this channel design and configuration may be ideal for a hotter region of the airfoil 100, for example the leading edge 120, where the higher temperature means that the cooling media absorbs the requisite amount of heat in a shorter time. This may compensate for the reduced mixing time since the heat may be absorbed at a faster rate. Other examples (not shown) may include additional impingement holes.

Dual Cold-Feed with Pedestal Example

Figure 10:
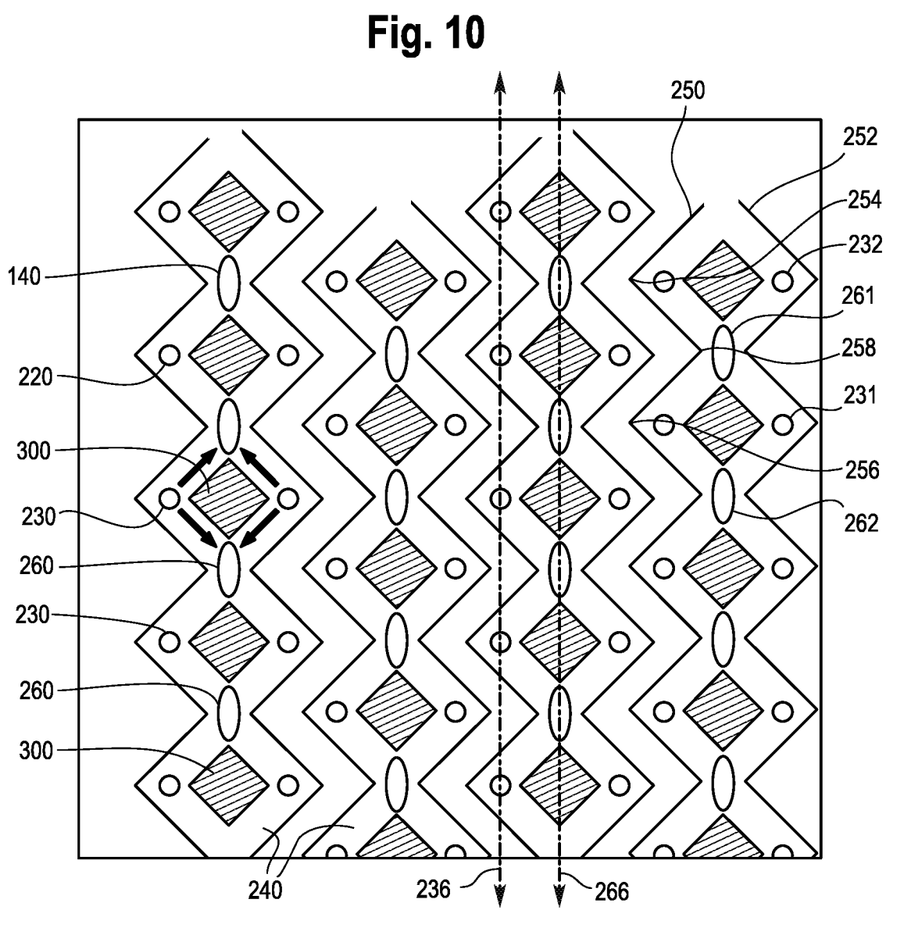
FIG. 10 illustrates a cross-sectional view of another example of internal channels of an airfoil.

FIG. 10 illustrates a cross-sectional view of an example including dual cold-feed internal channels 240 of an airfoil 100 where the channels 240 have at least one pedestal-like obstruction. The first side wall 250 and second side wall 252 may both separate the cold inner surface 164 (not shown) and the hot inner surface 154 (not shown) of the spar member 160 and cover member 150, respectively (see e.g., FIG. 3). The apertures 220 in the cold inner surface 164 may comprise a first impingement hole 231 and a second impingement hole 232 both in fluid communication with the hollow cavity 210 (e.g., cooling media source) for ingress of the cooling media into the internal channel 240. The exit holes 140 in the hot inner surface 154 may comprise a first angled film hole 261 in fluid communication with the hot outer surface 152 of the cover member 150 for egress of the cooling media out of the internal channel 240. The first and second side walls 250 and 252, respectively, may enclose a length of the channel along which the first angled film hole 261 is located between the first and second impingement holes 231 and 232, respectively. As shown, the impingement holes 230, 231, and 232 may appear circular, whereas the angled film holes 260, 261, and 262 may appear elliptical. This may be a result of the cross-sectional view, wherein the angled film holes are oriented at an acute angle such that they appear elliptical while the impingement holes are oriented at an orthogonal angle such that they appear circular.

The first side wall 250 and second side wall 252 may have a series of orthogonal or ninety-degree (90°) turns or intersections. For example, the first side wall 250 may have first and second concave points 254 and 256 relative to the internal channel 240. Between these two points, the first side wall 250 may have a first convex point 258 relative to the internal channel 240. The second side wall 252 may be substantially symmetrical to the first side wall 250. The ninety-degree (90°) turns or intersections may increase turbulent flow of cooling media through the channels 240.

The of impingement holes 230 may be aligned along a first impingement hole axis 236, and the angled film holes 260 may be aligned along a first angled film hole axis 266. The first impingement hole axis 236 may be parallel to the first angled film hole axis 266.

There may be twice as many impingement holes 230 as angled film holes 260 (dual cold-feed). Each channel 240 may include one or more pedestal structures 300 spanning the height of the channel. The arrows shown in the left-most channel 240 illustrate the flow of a portion of the cooling media from two impingement holes 230 and around one pedestal 300. The pedestal 300 may act as an obstruction to the flow of cooling media and may create a turbulent flow. This turbulent flow may encourage mixing of the cooling media and increased heat transfer. As a result, the cooling media may remain in the internal channel 240 for a longer duration, increasing heat transfer from the surfaces of the internal channels 240. This may result in increased engine efficiency by reducing the amount of cooling media extracted from the compressor to cool the airfoil 100. Additionally, the turbulent flow and increased mixing of the cooling media may decrease the fraction of cooling media that enters through a given impingement hole and exits through the next angled film hole, again increasing heat transfer and engine efficiency.

ADDITIONAL ADVANTAGES

The concepts described herein, including the designs and configurations of internal channels 240 of an airfoil 100, may be utilized advantageously, for example, in large civil engines having reduced combustor feed pressures, especially in low ΔP (change in pressure) locations of the airfoil 100. The advantages of these designs include, but are not limited to, increased thermal efficiency and increased hot-side pressure margins (change in pressure between hot outer surface 152 and hot inner surface 154, in particular, the change in pressure across one or more of the plurality of angled film holes 260). Advantages may also include maintaining certain design requirements, for example, maintaining minimum wall thickness for casting yields, maintaining minimum hole spacing to meet longevity requirements, and maintaining a minimum footprint to allow close hot side hole spacing for enhanced film effectiveness.

Another advantage is increased redundancy in the system by having multiple impingement holes and multiple angled film holes. If any hole becomes plugged with debris or otherwise becomes less effective, there are multiple other holes nearby for cooling media to flow through, reducing any negative effect. This may increase the lifespan of an airfoil since regions near any holes plugged with debris may remain within the expected range of operational temperatures. There may also be additional heat transfer due to unsteady effects (e.g., flow may be split unevenly between adjacent impingement holes wherein flow switches rapidly during operation, increasing heat transfer). As discussed throughout this application, the flow of cooling media through the internal channels 240 may also encourage the cooling media to remain within the channels 240 for longer (increased heat transfer), instead of flowing out of the nearest angled film hole.

The examples disclosed herein and the related designs mitigate ingestion of hot-side air and provide increased heat transfer due to the design and configuration of the concave portions 254 and 256, and convex intersection point 258 (which collectively may be referred to as the side wall protrusions). The side wall protrusions may cause the cross-sectional area of the channel to advantageously vary along the length of the channel. As a result, the cooling media may flow faster through the narrower sections resulting in a lower pressure, and may flow slower through the wider sections resulting in a higher pressure. As illustrated in FIGS. 3-9, the wider sections (higher pressure) may be near the plurality of angled film holes 260, resulting in a higher pressure differential (e.g., hot side pressure margin) between the hot outer surface 152 and the hot inner surface 154, with the pressure higher in the internal channels 240. The higher pressure drop across the angled film holes 260 may discourage the ingestion of air into the internal channels 240 from the angled film holes 260, improving engine efficiency and cooling efficiency due to optimized heat transfer. This may also make the airfoil 100 more robust because the higher pressure may discourage the ingress of debris or other outside matter into the internal channels 240. The baseline pressurized cooling media may also discourage such ingress of debris and/or ingestion of hot-side air.

While various embodiments of the invention have been described, the invention is not to be restricted except in light of the attached claims and their equivalents. These concepts may be applicable to other components within a jet engine, turbines, compressors, and other actively cooled components, not necessarily airfoils only. Moreover, the advantages described herein are not necessarily the only advantages of the invention and it is not necessarily expected that every embodiment of the invention will achieve all of the advantages described.

We claim:

1. An actively cooled component, comprising:
    a body comprising an internal channel adapted for a flow of a cooling media therein, said internal channel comprising first and second side walls separating a cold inner surface and a hot inner surface,
    wherein the cold inner surface comprises a first impingement hole and a second impingement hole both in fluid communication a cooling media source for ingress of the cooling media into the internal channel,
    wherein the hot inner surface comprises a first angled film hole and a second angled film hole each in fluid communication with a hot outer surface for egress of the cooling media out of the internal channel,
    wherein the first and second side walls enclose a length of the internal channel along which the first impingement hole and the second impingement hole are between the first and second angled film holes,
    wherein the first side wall comprises first and second concave portions relative to the internal channel that intersect with one another to form a convex intersection point,
    wherein the first impingement hole is located closer to the first side wall than the second side wall and closer to the first angled film hole than the second angled film hole, and
    wherein the second impingement hole is located closer to the second side wall than the first side wall and closer to the second angled film hole than the first angled film hole.

2. The actively cooled component of claim 1,
    wherein the cold inner surface comprises a plurality of first impingement holes, a plurality of second impingement holes, and a plurality of first angled film holes,
    wherein the plurality of first impingement holes are aligned along a first impingement hole axis,
    wherein the plurality of second impingement holes are aligned along a second impingement hole axis,
    wherein the plurality of first angled film holes are aligned along a first angled film hole axis,
    wherein the first and second impingement hole axes are parallel, and
    wherein the first angled film hole axis is parallel to the first and second impingement hole axes.

3. The actively cooled component of claim 1, wherein the first and second impingement holes direct the cooling media at the hot inner surface to create a turbulent flow, and the first angled film hole is angled to direct the cooling media along the hot outer surface to create a laminar film.

4. The actively cooled component of claim 3, wherein the first angled film hole is at an acute angle less than or equal to 45 degrees relative to the hot outer surface.

5. The actively cooled component of claim 1, further comprising third and fourth impingement holes,
    wherein the first and third impingement holes are aligned along a first axis,
    wherein the second and fourth impingement holes are aligned along a second axis, and
    wherein the first and second axes are parallel.

6. The actively cooled component of claim 5, wherein the first and second angled film holes are aligned along a third axis parallel to the first and second axes, and the third axis is located between the first and second axes.

7. The actively cooled component of claim 1, wherein there are at least twice as many impingement holes as angled film holes.

8. The actively cooled component of claim 7, wherein the actively cooled component is at a leading edge of an airfoil.

9. The actively cooled component of claim 1, wherein the first concave portion has a first radius of curvature, and the second concave portion has a second radius of curvature different from the first radius of curvature.

10. The actively cooled component of claim 1, wherein the convex intersection point protrudes toward a middle of the internal channel.

11. The actively cooled component of claim 1, further comprising a third impingement hole,
    wherein a first portion of the internal channel has a ratio of impingement holes to angled film holes of at least two-to-one, and
    wherein a second portion of the internal channel has a ratio of impingement holes to angled film holes of one-to-one.

12. An airfoil, comprising:
    a first side wall and a second side wall forming a length of a convective cooling passage and separating a cold surface and a hot surface, wherein the cold surface comprises first and second impingement holes for ingress of a cooling media into the convective cooling passage, wherein the hot surface comprises first and second angled film holes for egress of the cooling media out of the convective cooling passage, wherein the first and second impingement holes and the first and second angled film holes are all located between the first and the second side walls of the convective cooling passage, wherein the convective cooling passage comprises a segment along a length of the convective cooling passage from the first impingement hole to the second impingement hole, wherein the first impingement hole and the second impingement hole are between the first and second angled film holes along the length, wherein the first side wall comprises first and second concave portions relative to the convective cooling passage that intersect with one another to form a convex intersection point, wherein the first impingement hole is located closer to the first side wall than the second side wall and closer to the first angled film hole than the second angled film hole, and wherein the second impingement hole is located closer to the second side wall than the first side wall and closer to the second angled film hole than the first angled film hole.

13. The airfoil of claim 12,
wherein the cold surface comprises a plurality of first impingement holes, a plurality of second impingement holes, and a plurality of first angled film holes,
wherein the plurality of first impingement holes are aligned along a first impingement hole axis,
wherein the plurality of second impingement holes are aligned along a second impingement hole axis,
wherein the plurality of first angled film holes are aligned along a first angled film hole axis,
wherein the first and second impingement hole axes are parallel; and
wherein the first angled film hole axis is parallel to the first and second impingement hole axes.

14. The airfoil of claim 12, wherein the first and second impingement holes direct the cooling media at the hot surface to create a turbulent flow, and the first angled film hole is angled to direct the cooling media along the hot surface to create a laminar film.

15. The airfoil of claim 14, wherein the first angled film hole is at an acute angle less than or equal to 45 degrees relative to the hot surface.

16. The airfoil of claim 12, further comprising third and fourth impingement holes,
wherein the first and third impingement holes are aligned along a first axis,
wherein the second and fourth impingement holes are aligned along a second axis, and
wherein the first and second axes are parallel.

17. The airfoil of claim 16, wherein the first and second angled film holes are aligned along a third axis parallel to the first and second axes, and the third axis is located between the first and second axes.

18. A method of actively cooling a component, comprising:
providing a pressure differential to drive a flow of a coolant media;
driving the flow of coolant media through a plurality of apertures in a cold wall of the component, into a channel comprising a plurality of angled film holes and a plurality of impingement holes, wherein the flow of coolant media impinges on an inner surface of a hot wall of the component, and wherein a first side wall and a second side wall form a segment of the channel and separate the cold wall and the hot wall;
driving the flow of coolant media through the channel;
transferring heat energy from the hot wall to the coolant media;
driving the flow of coolant media along the segment of the channel from a first aperture of the plurality of apertures to a second aperture of the plurality of apertures, wherein a first impingement hole and a second impingement hole of the plurality of impingement holes are between a first angled film hole and a second angled film hole of the plurality of angled film holes along the segment of the channel, wherein the first impingement hole is located closer to the first side wall than the second side wall and closer to the first angled film hole than the second angled film hole, wherein the second impingement hole is located closer to the second side wall than the first side wall and closer to the second angled film hole than the first angled film hole, and wherein the first side wall comprises first and second concave portions relative to the channel that intersect with one another to form a convex intersection point; and
driving the flow of coolant media through the plurality of angled film holes, such that at least a portion of the coolant media forms a laminar film on an outer surface of the hot wall of the component.

\* \* \* \* \*